United States Patent
Cabalka et al.

(10) Patent No.: US 6,991,491 B2
(45) Date of Patent: *Jan. 31, 2006

(54) BULKHEAD CONNECTOR SYSTEM INCLUDING ANGLED ADAPTER

(75) Inventors: Eric John Cabalka, Edina, MN (US); Richard Thomas Demulling, Maplewood, MN (US); Jeffery Louis Peters, Eagan, MN (US); Michael Jay Follingstad, Edina, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/901,253

(22) Filed: Jul. 27, 2004

(65) Prior Publication Data

US 2005/0009400 A1  Jan. 13, 2005

Related U.S. Application Data

(63) Continuation of application No. 09/789,301, filed on Feb. 20, 2001, now Pat. No. 6,811,432, which is a continuation of application No. 09/615,984, filed on Jul. 14, 2000, now Pat. No. 6,231,380, which is a continuation of application No. 09/283,834, filed on Mar. 31, 1999, now Pat. No. 6,146,192.

(51) Int. Cl.
*H01R 13/60* (2006.01)

(52) U.S. Cl. ................................. 439/540.1

(58) Field of Classification Search ............ 439/540.1, 439/534, 550, 563, 536, 572

See application file for complete search history.

(56) References Cited

U.S. PATENT DOCUMENTS

| | | |
|---|---|---|
| 2,962,688 A | 11/1960 | Werner |
| 3,613,050 A | 10/1971 | Andrews |
| 4,273,413 A | 6/1981 | Bendiksen et al. |
| 4,307,926 A | 12/1981 | Smith |
| 4,558,172 A | 12/1985 | Zetena |

(Continued)

OTHER PUBLICATIONS

Kings Electronics Co. Inc. catalog pages—front cover page, pp. 1, 34-41, and back cover page, dated 1991.

(Continued)

*Primary Examiner*—P. Austin Bradley
*Assistant Examiner*—Phuongchi Nguyen
(74) *Attorney, Agent, or Firm*—Merchant & Gould PC

(57) ABSTRACT

An angled mounting plate is provided for mounting a connector at a bulkhead in an angled manner, such as for a coaxial or triaxial connector system. The angled mounting plate mounts to a yoke mounted around the connector. The yoke includes identical mounting halves held in place by fasteners. The yoke is held to the mounting plate by further fasteners. Vertical mounting plates can also be provided for mounting to the connectors. The bulkhead can be provided with mounting structure for mounting directly to the yokes.

7 Claims, 12 Drawing Sheets

U.S. PATENT DOCUMENTS

| | | |
|---|---|---|
| 4,669,802 A | 6/1987 | Schaffer |
| 4,813,887 A | 3/1989 | Capp |
| 5,066,247 A | 11/1991 | Watson |
| 5,118,303 A | 6/1992 | LeBaron et al. |
| 5,129,842 A | 7/1992 | Morgan |
| RE34,955 E | 5/1995 | Anton et al. |
| 5,620,339 A | 4/1997 | Gray et al. |
| 5,730,623 A | 3/1998 | Krantz et al. |
| 5,893,777 A | 4/1999 | Kantor |
| 5,967,852 A | 10/1999 | Follingstad et al. |
| 6,109,963 A | 8/2000 | Follingstad et al. |
| 6,146,192 A | 11/2000 | Cabalka et al. |
| 6,231,380 B1 | 5/2001 | Cabalka et al. |

OTHER PUBLICATIONS

Kings Electronics Co. Inc. catalog pages—front cover page, pp. 11 and 12, and back cover page.

Kings Electronics Co. Inc. catalog pages—front cover page, pp. 1, 20-24, and back cover page, dated 1997.

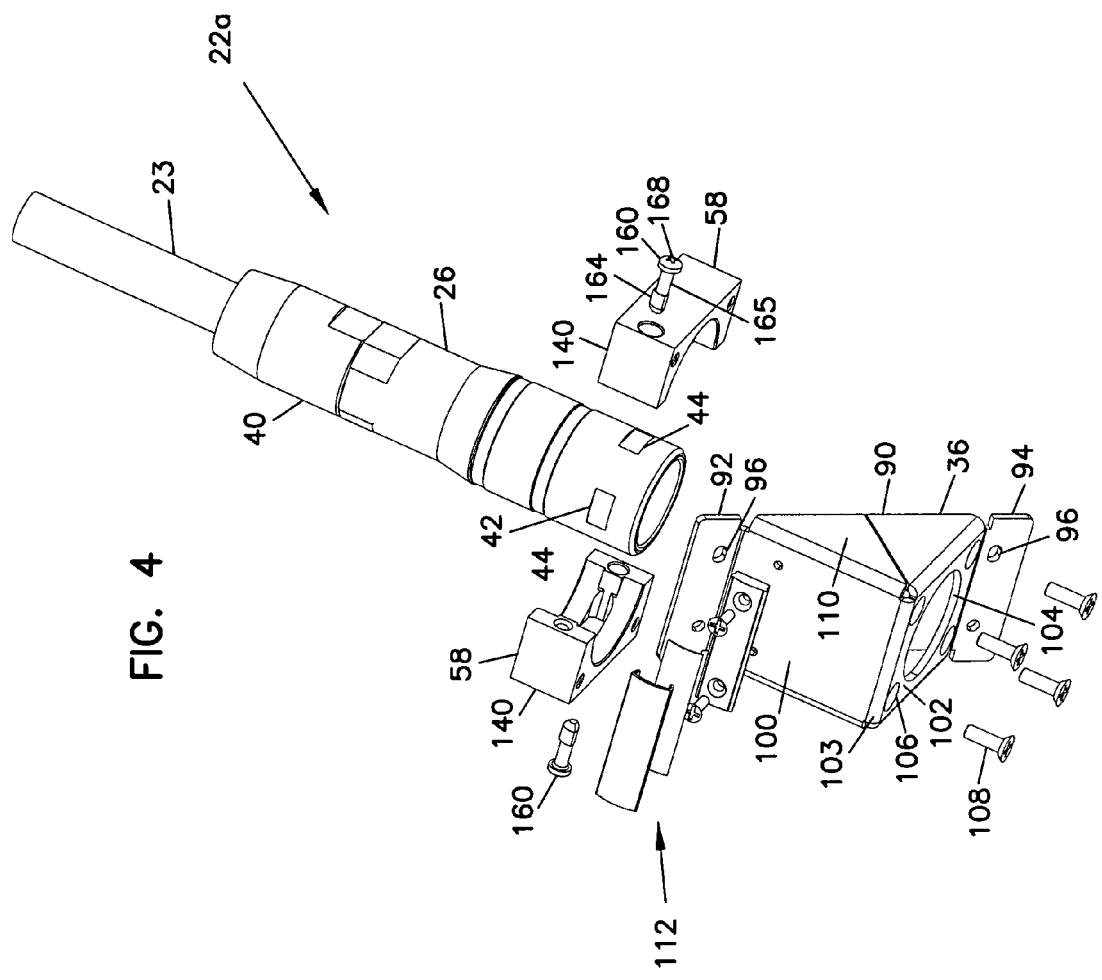
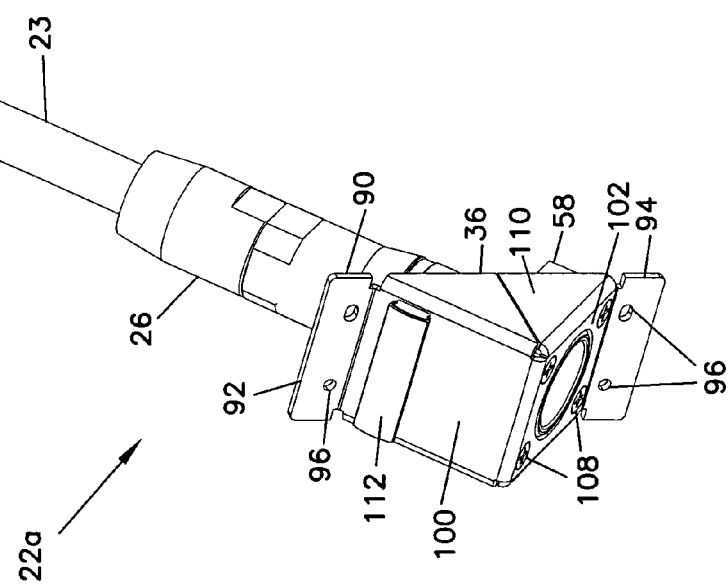

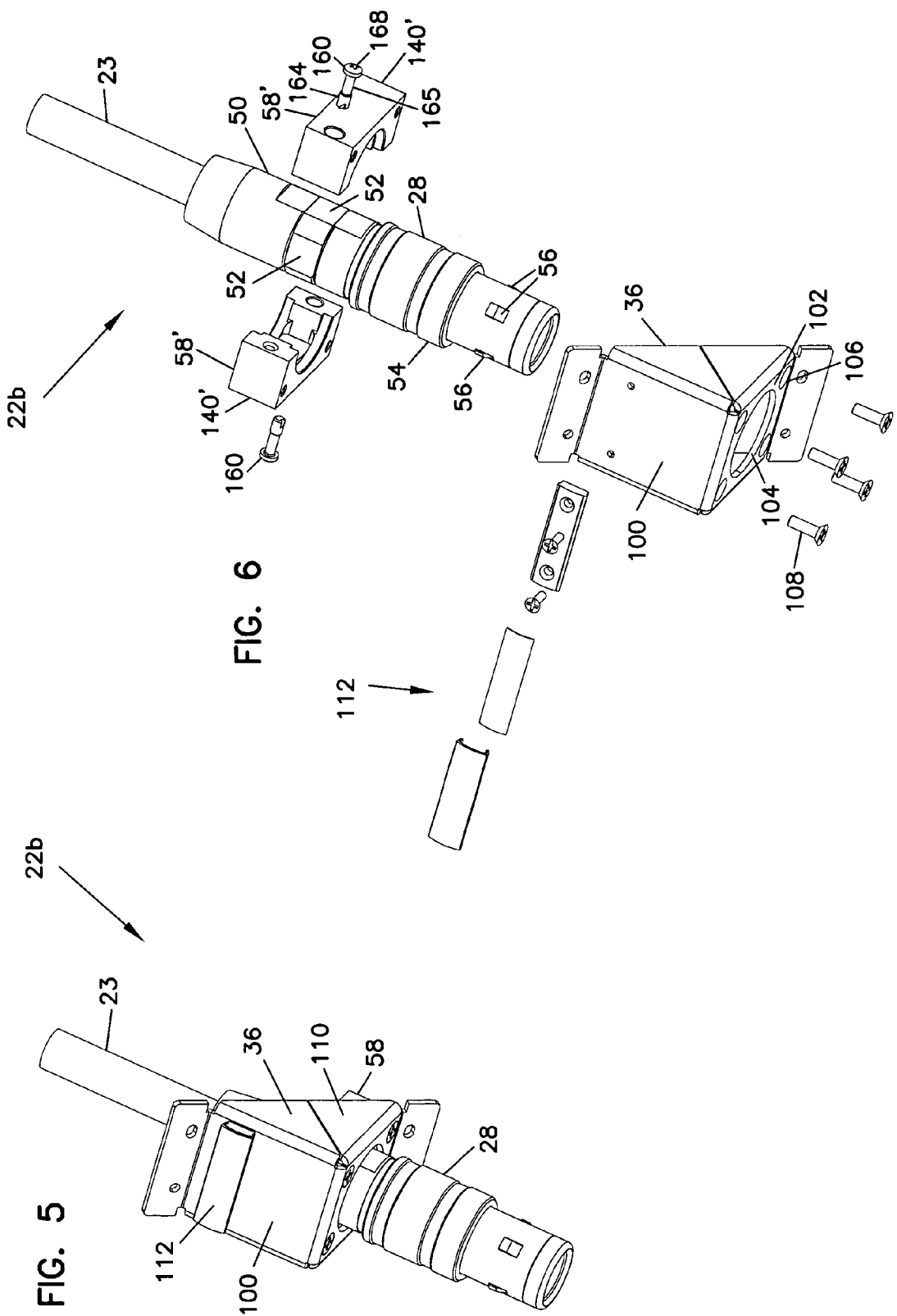

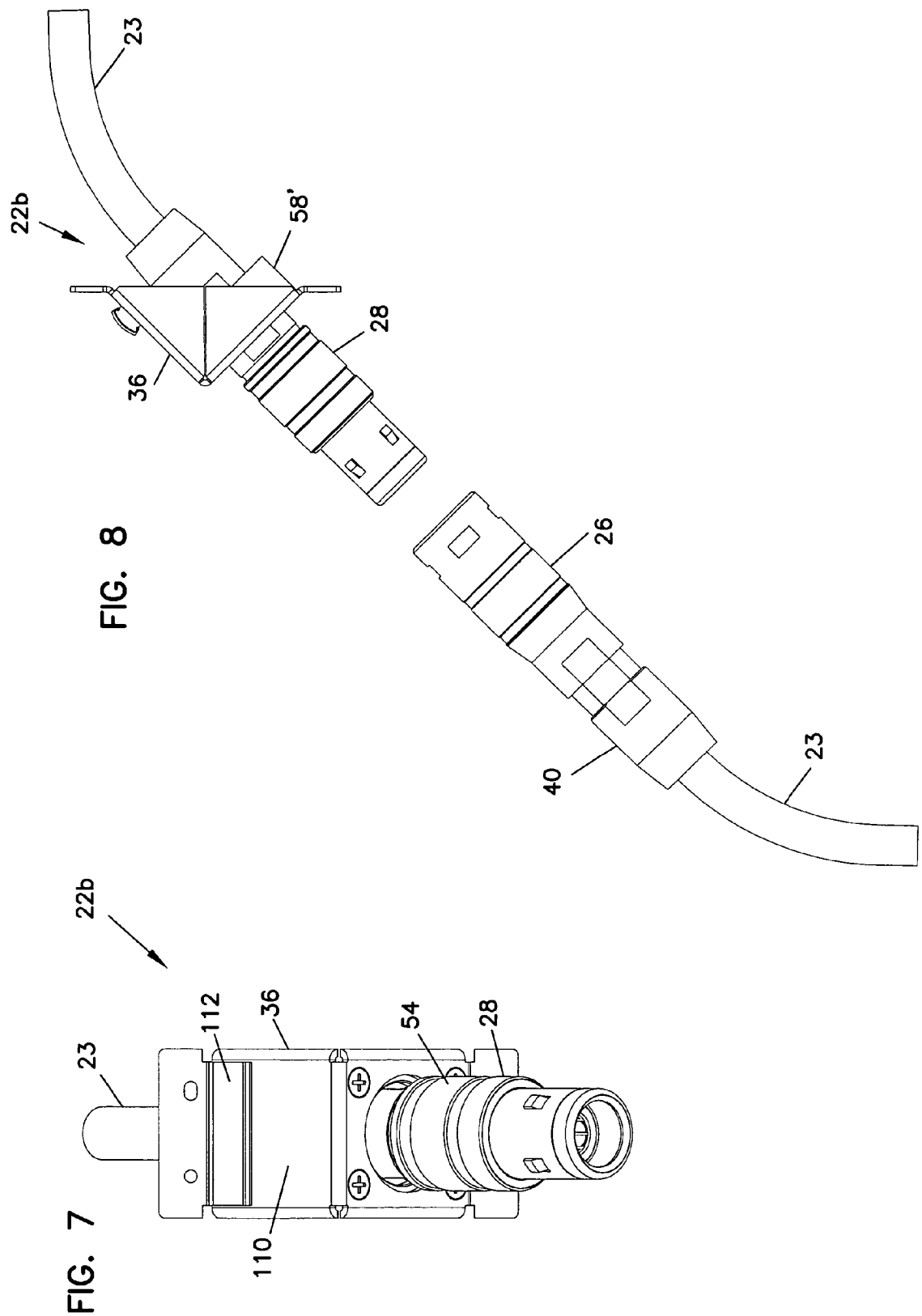

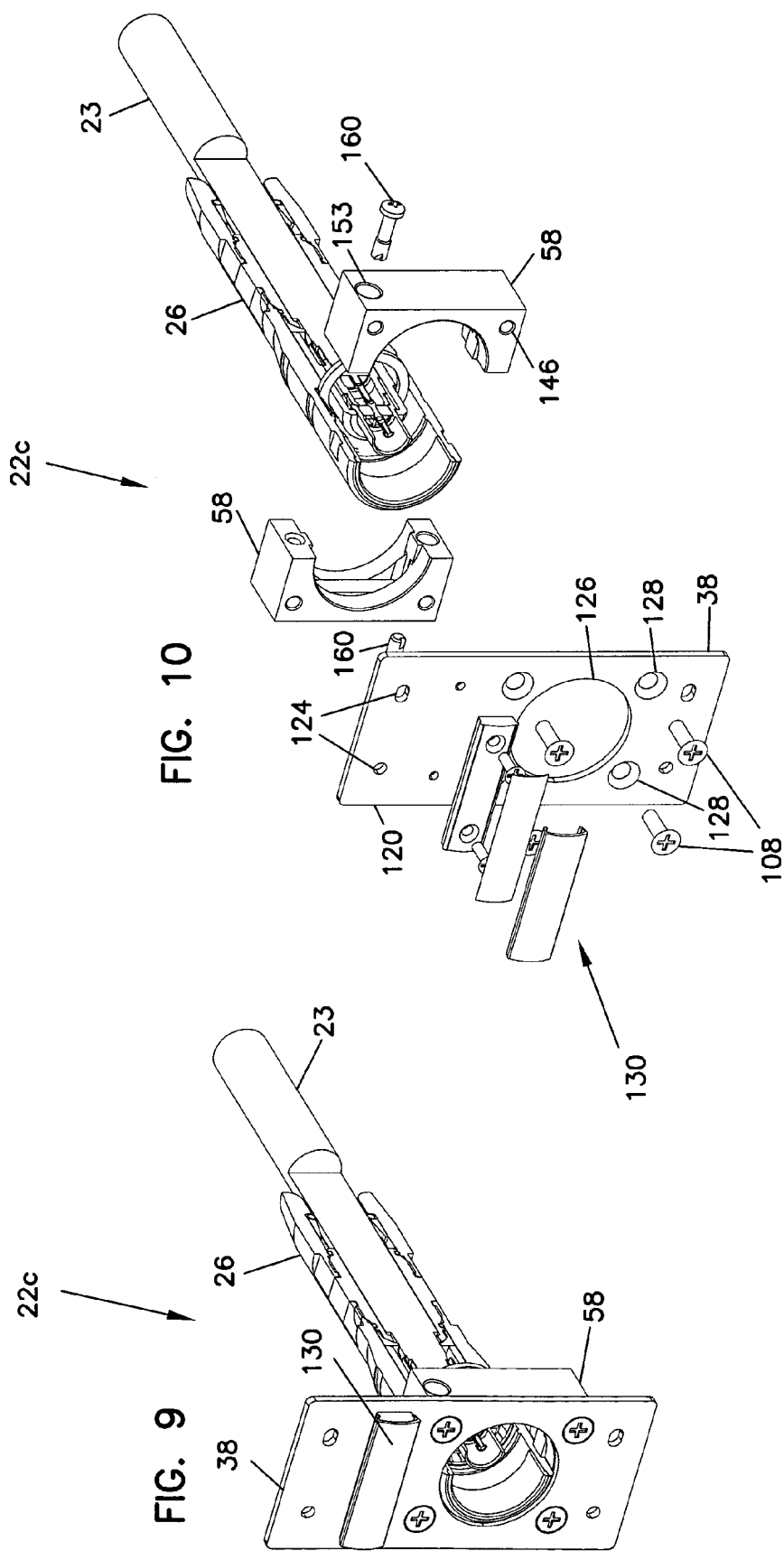

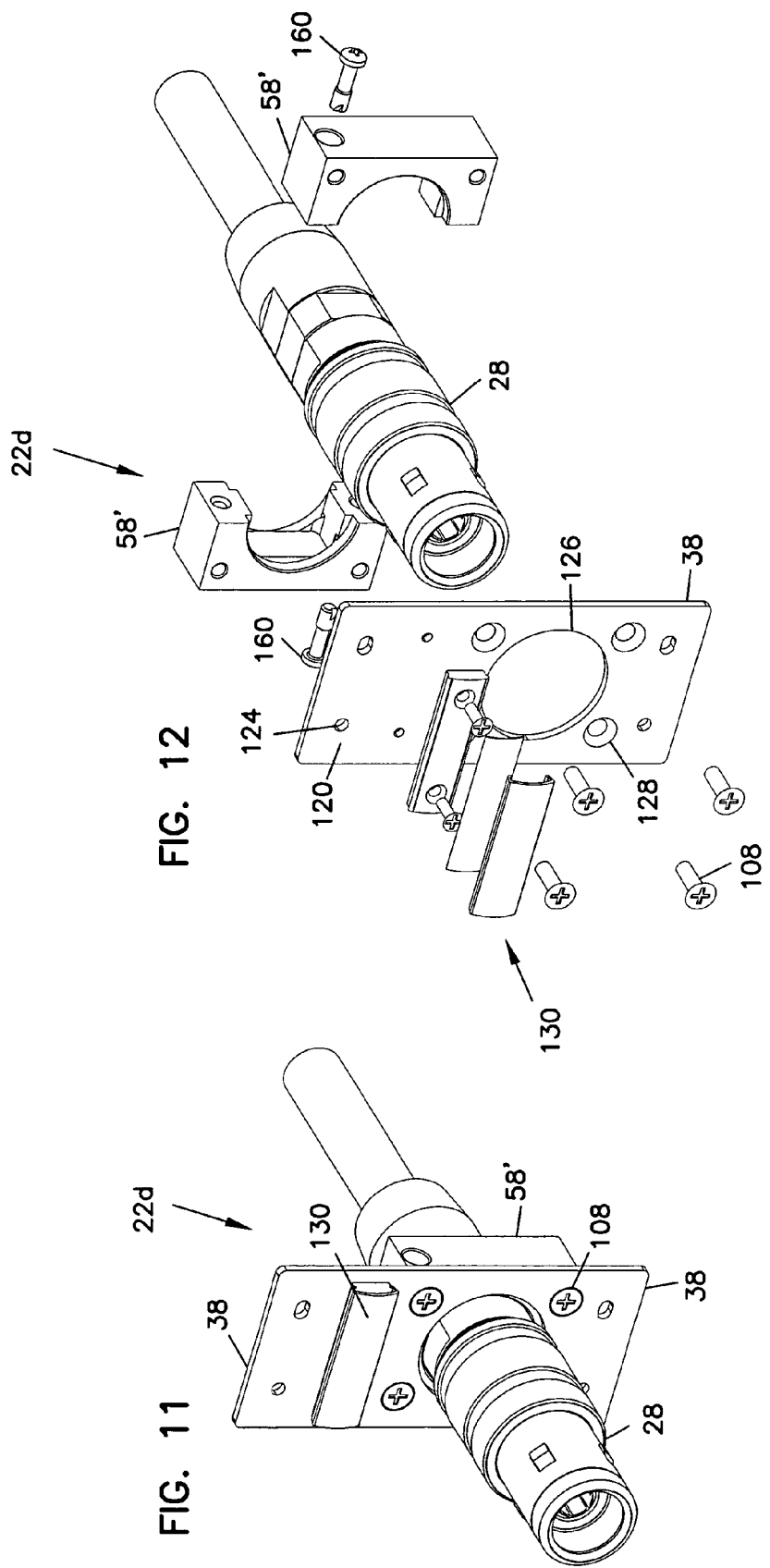

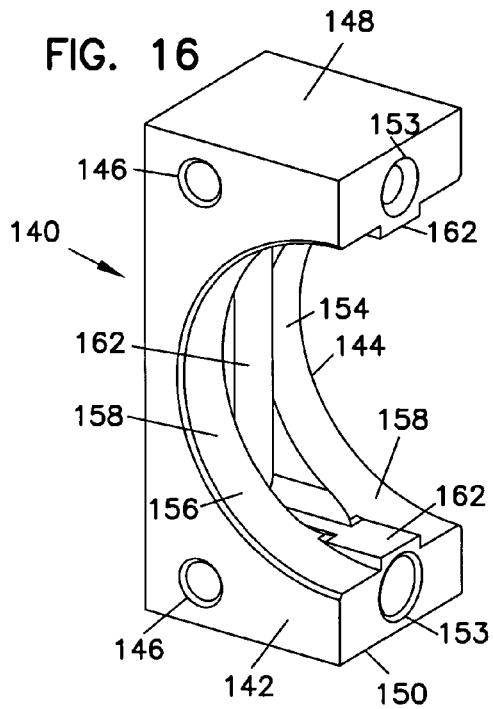
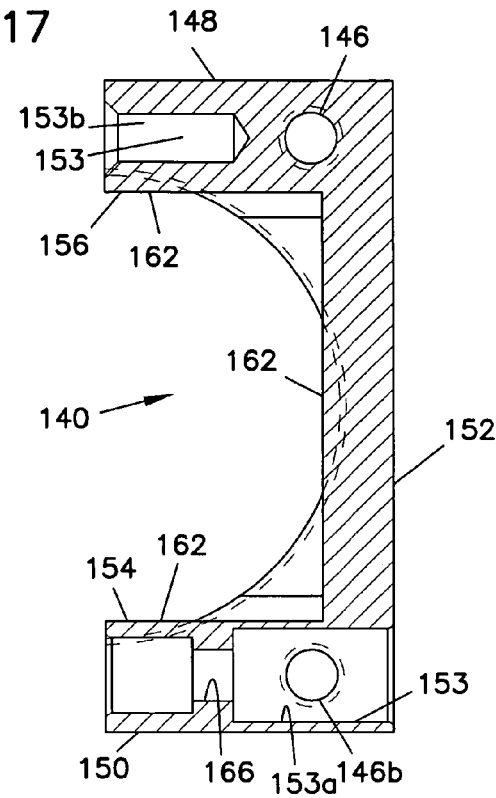
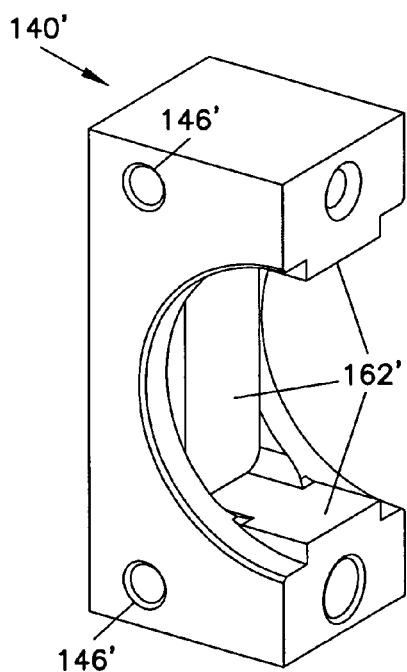
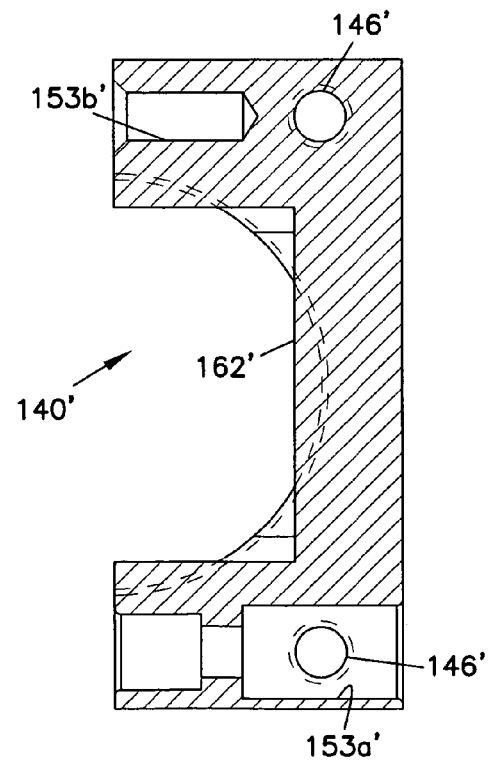

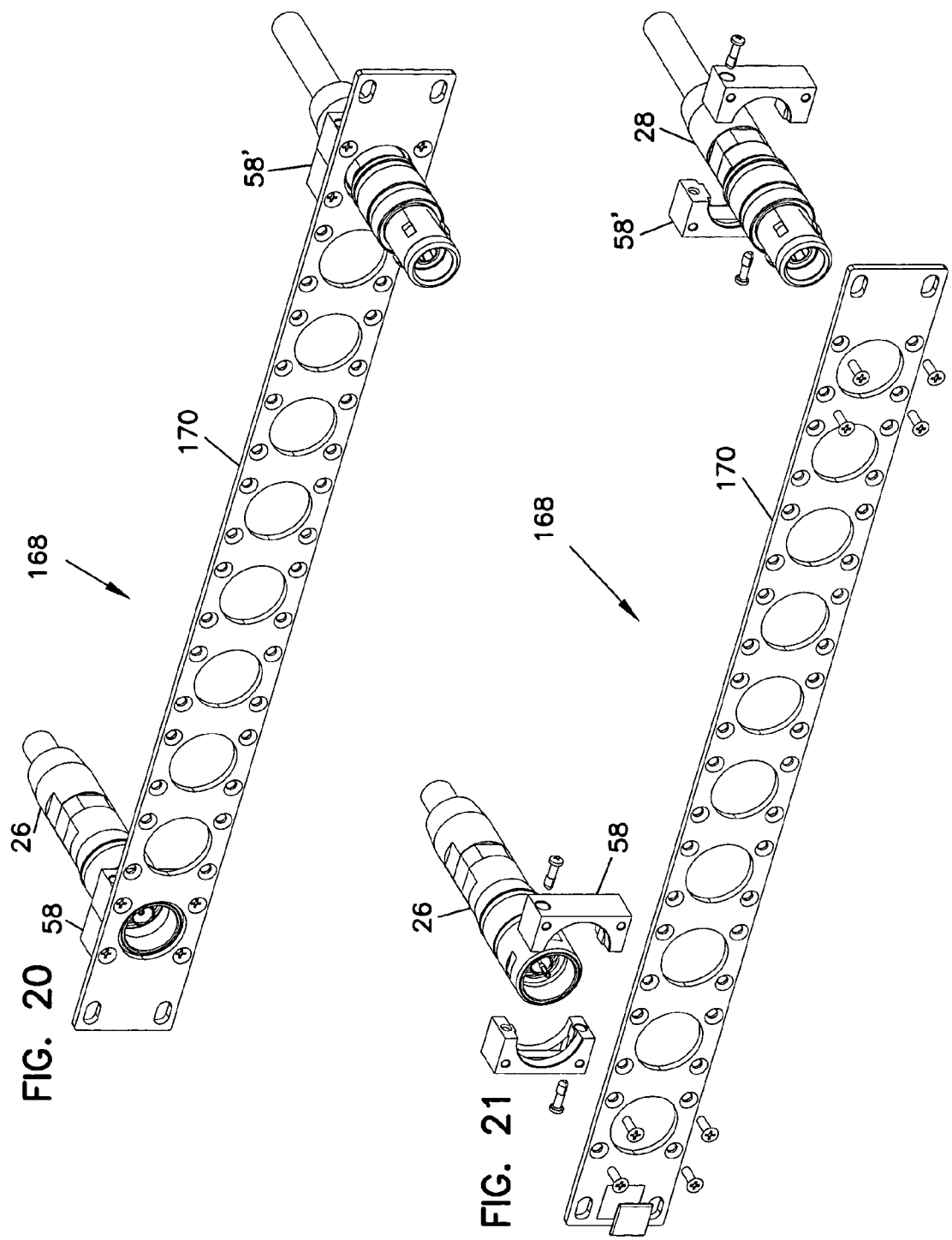

BULKHEAD CONNECTOR SYSTEM INCLUDING ANGLED ADAPTER

CROSS REFERENCE TO RELATED APPLICATIONS

This application is a continuation application of application Ser. No. 09/789,301 filed Feb. 20, 2001, now U.S. Pat. No. 6,811,432, which is a continuation application of application Ser. No. 09/615,984 filed Jul. 14, 2000 now U.S. Pat. No. 6,231,380, which is a continuation application of application Ser. No. 09/283,834 filed Mar. 31, 1999 now U.S. Pat. No. 6,146,192, which application(s) are incorporated herein by reference.

FIELD OF THE INVENTION

The present invention relates to telecommunications transmission line connector systems for connecting cables between equipment, such as at a bulkhead.

BACKGROUND OF THE INVENTION

Various connection systems are known for connecting cables and equipment. In the case of triaxial transmission cables, a central bulkhead may be provided defining a plurality of connection locations for connecting video cameras to related equipment. The bulkhead typically holds the connector of a first cable for connection to the connector of the second cable running to the remote camera or other equipment.

Concerns in this area include ease of assembly and use of the bulkhead and connection locations, and avoidance of unnecessary stresses applied to the cables or the connectors. There is a need for continued development of connection systems which address these and other concerns.

SUMMARY OF THE INVENTION

One aspect of the present invention relates to a connector mounting arrangement including an angled mounting plate having a generally planar back face including opposed mounting flanges for mounting to a bulkhead, and an angled front face positioned at an angle to the back face, and facing partially vertically downwardly when mounted to the bulkhead. The angled front face defines an opening for receipt of a first connector. The connector system further includes a yoke mountable to the angled mounting plate for holding the first connector within the opening. The first connector is connectable to a second connector at the bulkhead.

The present invention also relates to a connector mounting arrangement including a panel, and a plurality of yokes mounted to the panel, with each yoke holding a connector to the panel. The mounting arrangement further may include an adapter plate mounted to the panel, wherein the yoke is mounted to the adapter plate. The adapter plate may include an angled front face extending at least partially vertically downwardly.

The present invention further relates to a yoke including identical halves which surround a connector having a non-cylindrical outer mating surface portion for mounting the connector to a mounting plate or a bulkhead. Each half of the yoke includes front and rear faces, and opposed side faces. One side face defines a central opening between the front and rear faces, wherein the central opening has a mating surface portion for engaging the non-cylindrical outer mating surface portion of the connector. Each half generally includes two fastener openings or other mounting structure, such as a snap, for connecting the halves around the connector. Each half further includes at least one fastener opening extending between the front and rear faces for mounting each half to the mounting plate or bulkhead.

The present invention also relates to an angled mounting plate or bracket including a rear planar face having top and bottom flanges, with each flange defining openings for receipt of fasteners for mounting the plate to a bulkhead. The plate further includes a top angled face and a bottom angled face both extending away from the rear face toward each other. The bottom angled face includes an opening for a connector, and openings for receipt of fasteners for mounting a yoke to the plate, wherein the yoke holds the connector. The plate further preferably includes a designation strip on the top angled face.

The present invention also relates to a triaxial connector including a female connector body having a generally cylindrically shaped tip, with the tip being provided with a plurality of equally spaced recesses in the outer surface for mating with a yoke for mounting to a mounting plate or bulkhead.

BRIEF DESCRIPTION OF THE DRAWINGS

FIG. 3 is a perspective view of an angle mounted female connector.

FIG. 4 is an exploded view of the angle mounted female connector of FIG. 3.

FIG. 5 is a perspective view of an angle mounted male connector.

FIG. 6 is an exploded view of the angle mounted male connector of FIG. 5.

FIG. 7 is a front view of the angle mounted male connector of FIG. 5.

FIG. 8 is a side view of the angle mounted male connector of FIG. 5, and a female connector positioned for connection to the male connector.

FIG. 9 is a perspective view of a vertically mounted female connector with portions shown in cross-section.

FIG. 10 is an exploded view of the vertically mounted female connector of FIG. 9.

FIG. 11 is a perspective view of a vertically mounted male connector.

FIG. 12 is an exploded view of the vertically mounted male connector of FIG. 11.

FIG. 16 is a perspective view of one-half of the yoke, as shown in FIGS. 4 and 10.

FIG. 17 is a cross-sectional front view of the yoke half shown in FIG. 16 through a center of the yolk half.

FIG. 18 is a perspective view of one-half of the yoke, as shown in FIGS. 6 and 12.

FIG. 19 is a cross-sectional front view of the yoke half shown in FIG. 18 through a center of the yolk half.

FIG. 20 is a perspective view of a second embodiment of a bulkhead showing vertically mounted connectors, where the yokes mount directly to the panel.

FIG. 21 is an exploded view of the bulkhead shown in FIG. 20.

DETAILED DESCRIPTION OF THE PREFERRED EMBODIMENTS

Figure 1:
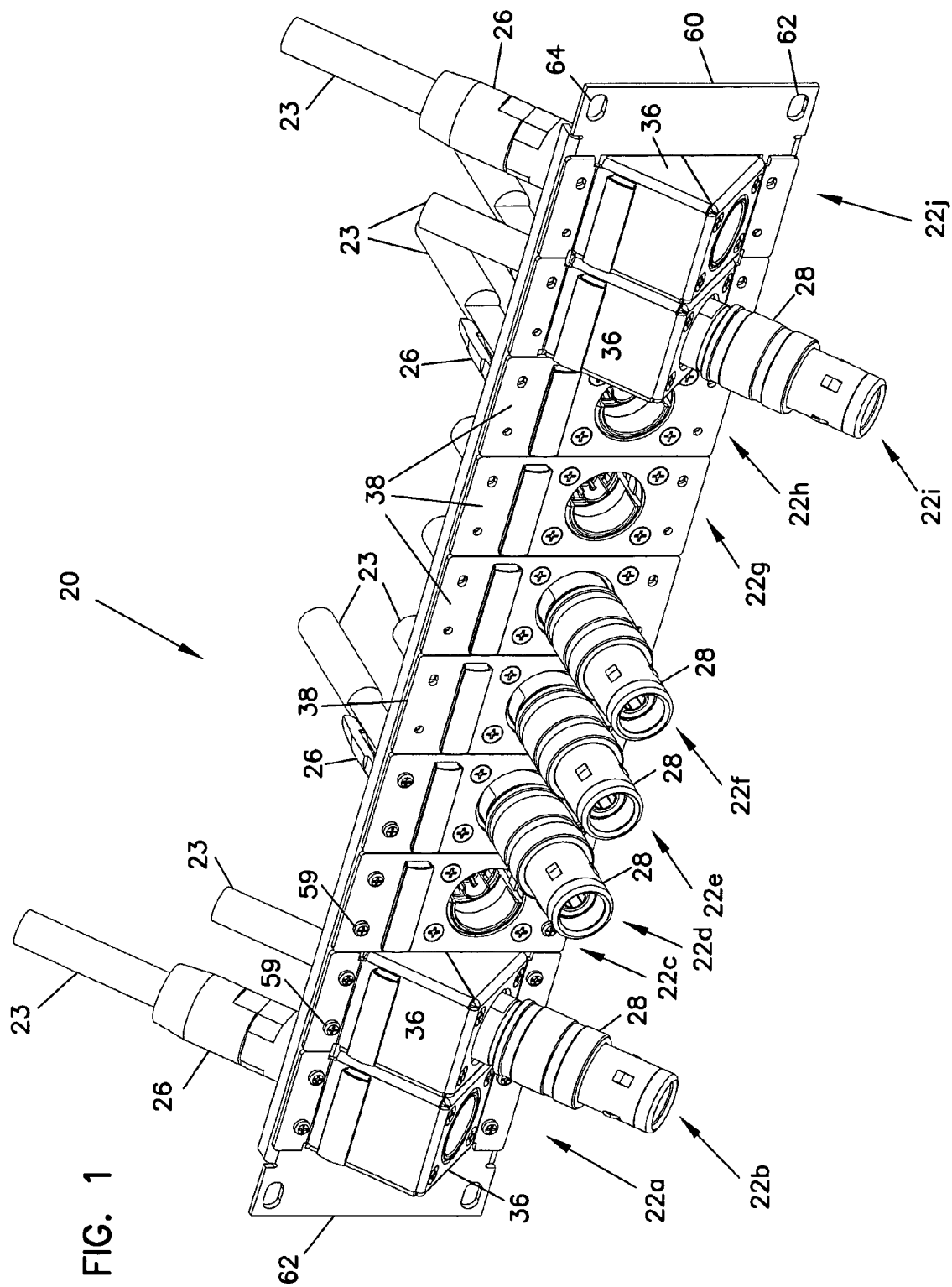
FIG. 1 is a perspective view of a first embodiment of a bulkhead including angle mounted male and female connectors, and vertically mounted male and female connectors.
Figure 2:
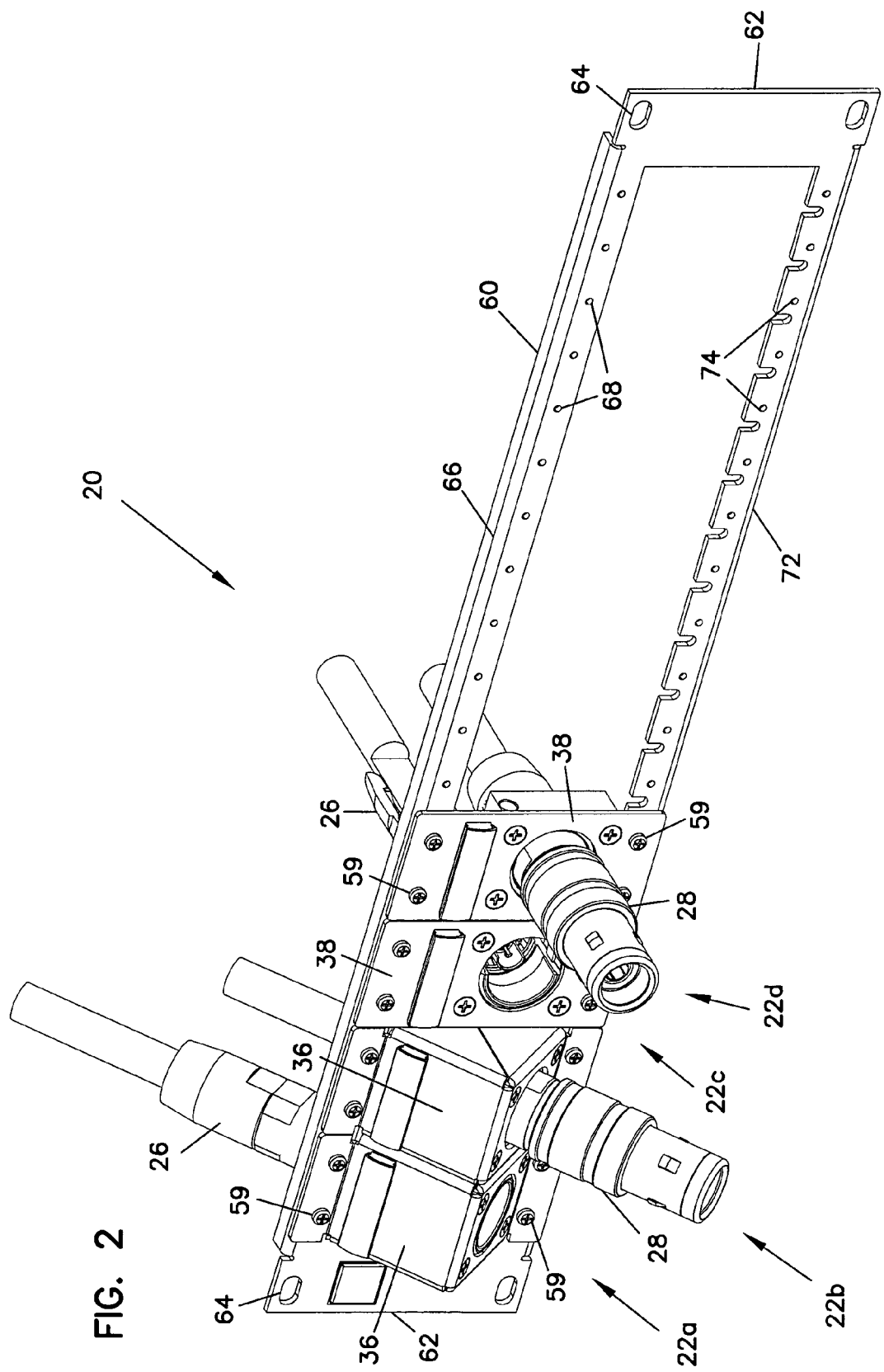
FIG. 2 is a perspective view of the bulkhead of FIG. 1 with some of the connectors and mounting plates removed from the panel.
Figure 14:
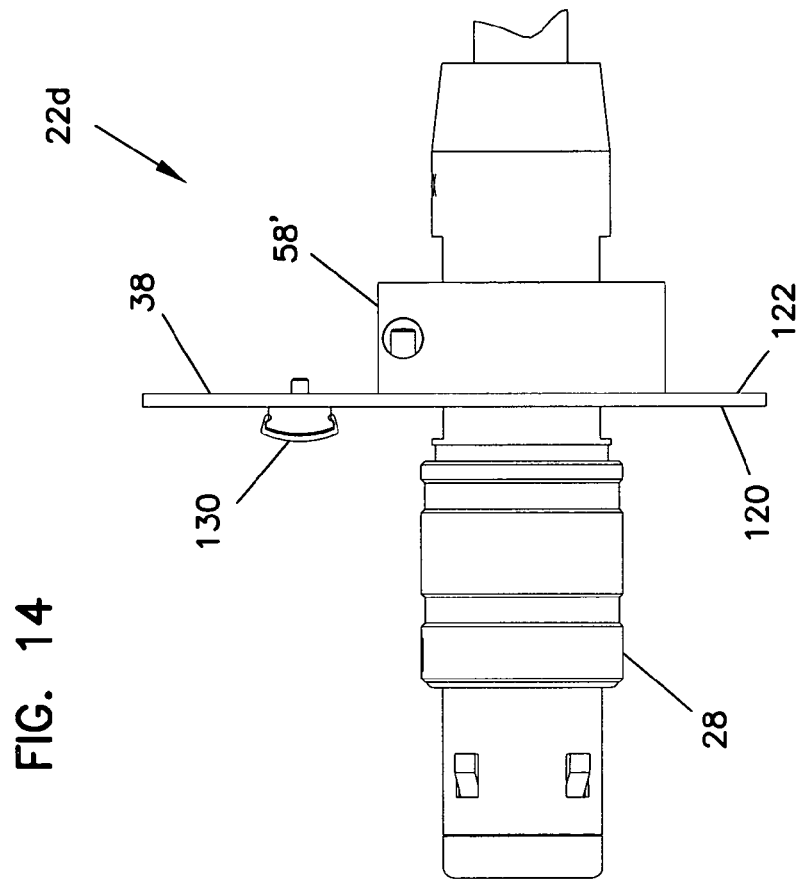
FIG. 14 is a side view of the vertically mounted male connector of FIG. 11.
Figure 13:
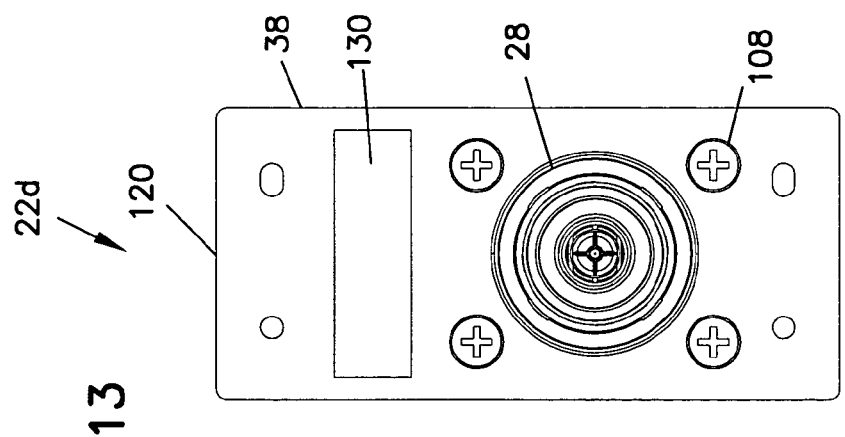
FIG. 13 is a front view of the vertically mounted male connector of FIG. 11.
Figure 15:
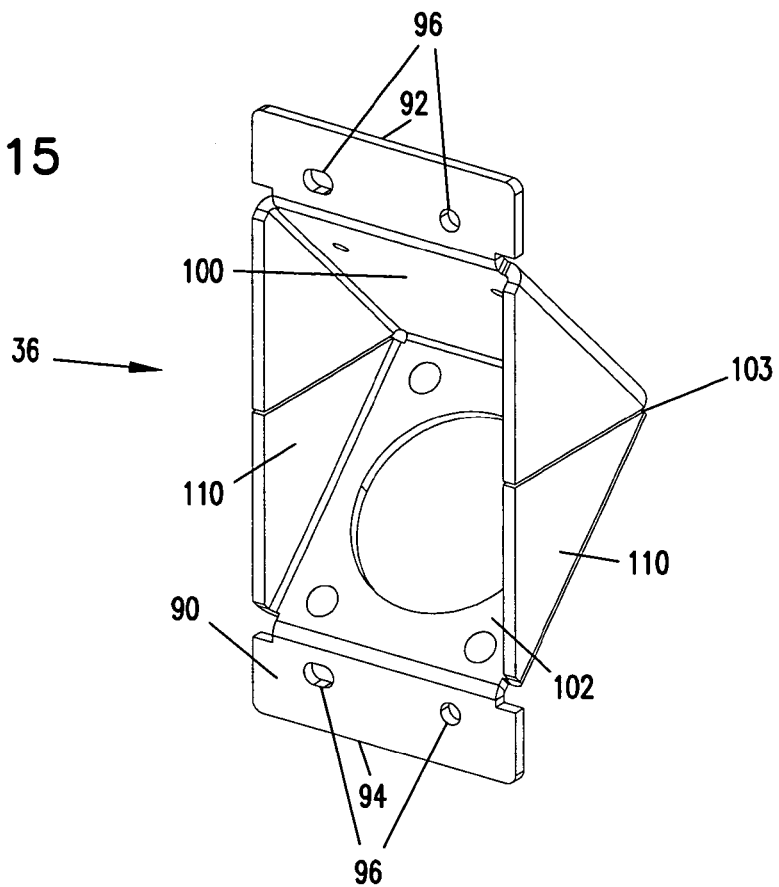
FIG. 15 is a rear perspective view of the angled mounting plate shown in FIGS. 1–8.

Referring now to FIG. 1, a first embodiment of a bulkhead 20 defining a plurality of connection locations 22a–22j is shown. Each connection location 22a–22j permits connection of a telecommunications cable to a front side of bulkhead 20. Each connection location 22a–22j is connected to a connector 26, 28, each extending rearwardly to a cable 23 and then to various pieces of telecommunications equipment. Bulkhead 20 is shown with only four different types of connection locations, best shown by the first four locations 22a–22d. These different types of connection locations can be provided in bulkhead 20 in different combinations, as desired, or as all of the same type.

At bulkhead 20, rear connectors 26, 28 are preferably mounted to bulkhead 20 in a semi-permanent manner so as to permit maintenance, upgrades, or repair of the system. Connection location 22a includes a female connector 26 mounted to an angled mounting plate 36. Connection location 22b includes a male connector 28 mounted to an angled mounting plate 36. Connection location 22c includes a female connector 26 mounted to a vertical mounting plate 38. Connection location 22d includes a male connector 28 mounted to a vertical mounting plate 38. A connector like female connector 26 is connectable to each male connector 28 to permit connection of a cable to the rearwardly extending cables 23. A connector like male connector 28 is connectable to each female connector 26 to permit connection of a cable to the rearwardly extending cables 23.

Referring now to FIGS. 4 and 22 and FIGS. 6 and 23, female connector 26, and male connector 28, respectively, are shown in greater detail. Female connector 26 includes a body 40 including a cylindrical tip or end 42 defining a non-cylindrical mating portion for mating with a mounting yoke. In the illustrated embodiment, connector 26 includes a plurality of spaced apart flats 44 defining the mating portion. In the embodiment shown, four equally spaced flats 44 are provided. Flats 44 are formed by small recesses or notches in cylindrical end 42. Flats 44 permit mounting with a yoke which holds connector 26 to bulkhead 20 and prevents rotation. Contained within body 40 is a center conductor 25 and at least one coaxial conductor 27 around the center conductor. Preferably, female connector 26 and cable 23 are triaxial, with a second coaxial conductor 29.

Figure 23:
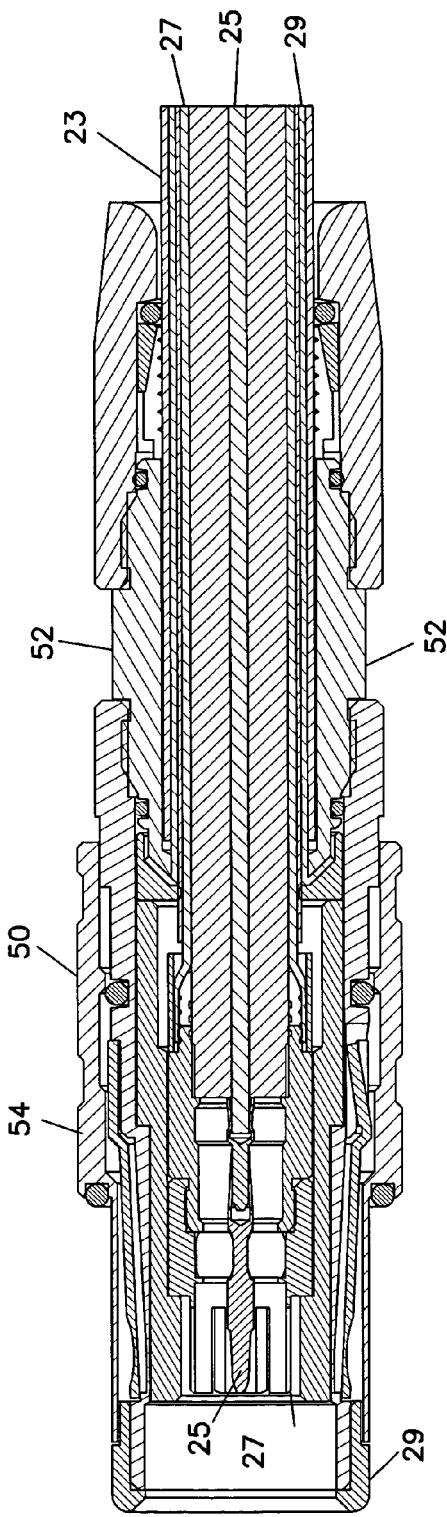
FIG. 23 is a cross-sectional side view of one embodiment of the male connector mounted to a cable.
Figure 22:
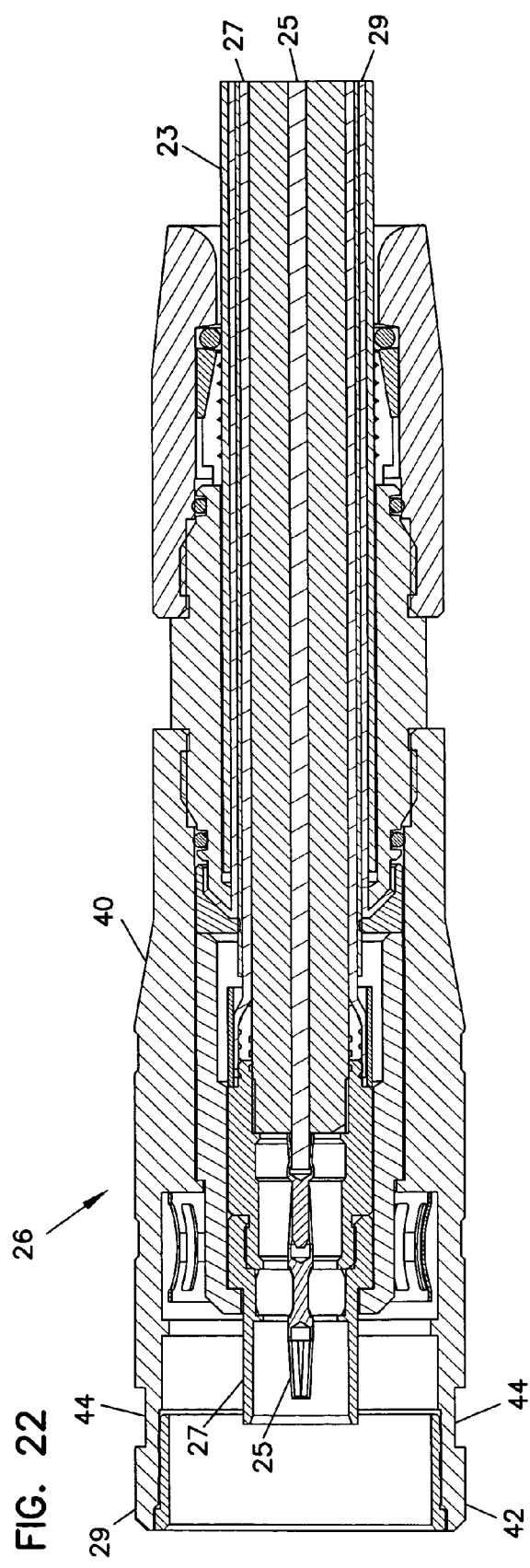
FIG. 22 is a cross-sectional side view of one embodiment of the female connector mounted to a cable.

Referring now to FIGS. 6 and 23, male conductor 28 includes a body 50 defining a non-cylindrical mating portion for mating with a mounting yoke. In the illustrated embodiment, connector 28 includes flats 52 around an outer periphery of the connector, spaced from an end of connector 28. Flats 52 permit mounting with a yoke which holds connector 28 to bulkhead 20 and prevents rotation. As noted, male connectors 28 project from bulkhead 20 to enable connection to a female connector on a front side of bulkhead 20.

Flats 52 in the illustrated embodiment are differently shaped from flats 44 of connector 26 to provide a one-way fit for the yokes 58, 58'. Flats 44 mate with yoke 58; flats 52 mate with yoke 58'. Body 50 also includes a longitudinal sliding sleeve 54 which is operable in retracting latching clips 56 to disconnect male connector 28 from a female connector, like female connector 26. Like female connector 26 and cable 23, male connector 28 and its corresponding cable 23 also include a center conductor surrounded by at least one coaxial conductor. Preferably male connector 28 and cable 23 are triaxial.

Female and male connectors 26, 28 are mounted to the respective mounting plates 36, 38 by a yoke or clamp 58, 58' as will be described in greater detail below. Connectors 26, 28 may be constructed in accordance with the embodiments shown in FIGS. 22 and 23, as further described in U.S. Ser. No. 09/007,855, the disclosure of which is incorporated by reference. The connectors 26, 28 can also have other configurations for triaxial systems. The connectors shown in Ser. No. 09/007,855 include field repairable center conductor tips. While this is a preferred feature, the connectors can be more conventional connectors with the front conductor portions of the connector crimped to the conductors of the cable. The connectors and cables may be coaxial (1 coaxial conductor around the center conductor). The connectors and cables may also be fiber based or hybrid.

For bulkhead 20, a main panel 60 is provided with end flanges 62 including fastener openings 64 for mounting to a rack or frame. Main panel 60 includes a top edge 66 and a bottom edge 72. Top edge 66 and bottom edge 72 include fastener openings 68, 74, respectively, for receipt of fasteners 59 of mounting plates 36, 38. An alternative bulkhead may include a different main panel 60, or a different order or composition for the various female and male connectors 26, 28, and the various angled and vertical mounting plates 36, 38, as desired.

Referring now to FIGS. 3–8 and 15, angled mounting plate 36 is shown in greater detail. A rear face 90 defines a rearwardly facing vertical plane. Top and bottom flanges 92, 94 each define a plurality of openings 96 for receipt of fasteners 59 for mounting angled mounting plate 36 to main panel 60, or other panels in a bulkhead. Angled mounting plate 36 includes an angled top face 100, and an angled bottom face 102 which converge at apex 103. Bottom face 102 includes a main opening 104 for receipt of a connector. Bottom face 102 further includes a plurality of openings 106 for receipt of fasteners 108 of yoke 58. Yoke 58' is also mountable in a similar manner to angled mounting plate 36. Angled mounting plate 36 further includes two opposed vertical side faces 110. Top face 100 preferably includes a designation strip 112 for identifying the connection location.

Referring now to FIGS. 9–14, vertical mounting plate 38 includes opposite facing front and rear faces 120, 122. First openings 124 are provided for receipt of fasteners 59 for mounting vertical mounting plate 38 to main panel 60 or other panel of a bulkhead. A central opening 126 is provide for the connector. Second openings 128 are provided for receipt of fasteners 108 for yoke 58. Yoke 58' is also mountable in a similar manner to vertical mounting plate 38. Vertical mounting plate 38 further includes a designation strip 130 for identifying the connection location.

Referring to FIGS. 4, 6, 10, 12, and 16–19, yokes 58, 58' are shown. Yokes 58, 58' are generally configured in a similar manner, but differ in the structure which mates to the respective mating structure of each connector (for example, flats 44, and flats 52 of each connector 26, 28). Yoke 58 for mating with female connector 26 will be described now and includes two yoke halves 140, preferably constructed in an identical manner, and positioned in a flipped and inverted orientation around each connector 26. Yoke halves 140 are held together around connector 26 by a mounting arrangement. Corresponding parts for yoke 58' are designated with an apostrophe. Each half 140 includes first and second main faces 142, 144. Openings 146 extend between the first and second faces 142, 144 for receipt of fasteners 108 to mount each half 140 to one of mounting plates 36, 38. Each half preferably includes two openings 146.

Each half 140 further includes opposite facing ends 148, 150. Each half 140 further includes an outwardly facing side 152 and an inwardly facing side 154. Outwardly facing side 152 includes an opening 153 for receipt of a fastener 160 to mount the respective halves together. Inwardly facing side 154 includes a connector engagement surface 156 having an arcuate portion 158 on opposite sides of each half 140. The arcuate portions 158 define a central opening for yoke 58 for receiving the connector. Adjacent a central portion of each half 140 is provided one or more flats 162 for engagement with flats 44 of each connector 26. As shown in the drawings, wider (in the longitudinal axis direction) flats 162' are provided for half 140' of yoke 58'. As shown, neither yoke is mountable to the other connector, since the flats 162, 162' do not mate securely around the other connector.

One preferred fastener 160 of yokes 58, 58' includes a captivated screw including a threaded tip 164, and a cylindrical shaft 165. Threaded tip 164 is threaded past reduced diameter portion 166 of opening 153a for retention in opening 153a, prior to threaded engagement with opening 153b with the other half of yoke 58. Each half 140 preferably includes one opening 153a for engaging the head 168, and one opening 153b for engaging threaded tip 164 of the second fastener 160. As shown, the axes for openings 153 intersect the axes for openings 146, permitting a compact construction, in the preferred embodiment.

Figure 24:
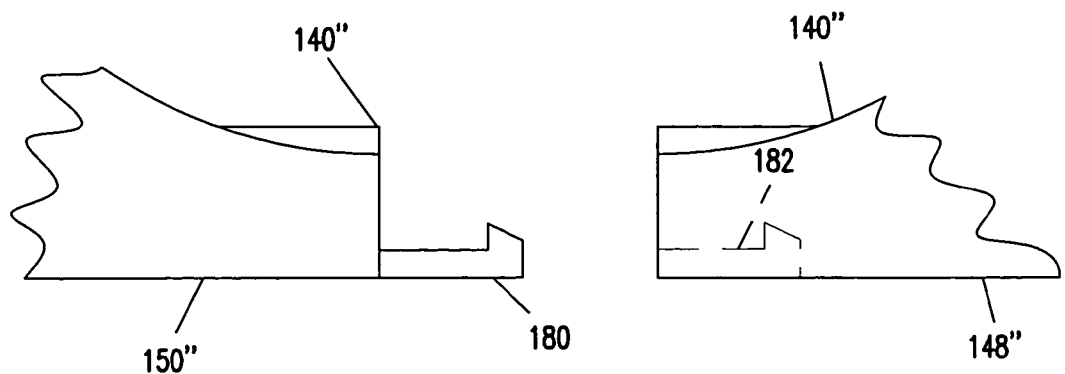
FIG. 24 shows an alternative mounting arrangement between yoke halves.

Fasteners 160 are one example mounting arrangement between halves 140. FIG. 24 shows a different mounting arrangement, including a snap system. Snap system includes a flexible tab 180 which extends from one half 140", and a recess on the other half 140" for receiving the tab 180 to hold the halves 140" around connector 26.

As best shown by referring to FIG. 8, cable 23 is allowed to bend as it exits rearwardly from male connector 28 positioned at an angle by angled mounting plate 36. On a front side of male connector 28, a female connector 26 would be positioned in mating engagement therewith. Cable 23 extending from the female connector 26 in FIG. 8 does not bend as sharply as the cable exits from the female connector body 40, as it would if it was extending horizontally. A similar situation exists for the male connectors 28 mounted to the female connectors 26 defining the connection locations in bulkhead 20.

While the illustrated preferred angle for angled mounting plate 36 is 45 degrees for the connector positioning, other angles are anticipated where the connector is positioned at angles greater than 45 degrees from the horizontal, or angles less than 45 degrees from the horizontal.

Referring now to FIGS. 20 and 21, yokes 58, 58' are shown mounted directly to a panel 170 to define an alternative bulkhead 168.

The above specification and examples provide a complete description of the manufacture and use of the invention. Since many embodiments of the invention can be made without departing from the spirit and scope of the invention, the invention resides in the claims hereinafter appended.

What is claimed is:

1. A telecommunications connector mounting arrangement comprising:
   a) a plurality of mounting plates, each mounting plate defining an opening for receipt of a connector, each mounting plate including a planar back face including opposed mounting flanges;
   b) a plurality of yokes, each yoke including a non-cylindrical central opening for receiving the connector, each yoke including two identical halves, wherein each yoke is mountable to one of the mounting plates for mounting to the connector;
   c) a panel, wherein the mounting flanges of the back face of the mounting plates are mountable to the panel.

2. The arrangement of claim 1, further comprising a connector held by one of the yokes, a longitudinal axis of the connector at a non-perpendicular angle to the back face of the mounting plate.

3. The arrangement of claim 1, further comprising a connector held by one of the yokes, a longitudinal axis of the connector at a perpendicular angle to the back face of the mounting plate.

4. The arrangement of claim 1, wherein a first plurality of the mounting plates includes an angled front face at an angle to the back face and facing partially downwardly, the angled front face defining the opening for receipt of the connector.

5. The arrangement of claim 1, wherein each half of each yoke includes first and second opposite planar faces, and opposed side faces, one side face of one half cooperating with one side face of the other half to define the central opening for the yoke;
   wherein each half of each yoke further includes a first fastener opening extending between the opposed side faces for receipt of a first fastener to mount the halves around the connector, each half including a second fastener opening extending from one of the first and second faces toward the other of the first and second faces for receipt of a second fastener for mounting each half to a planar surface of the mounting plate generally parallel to the first and second faces.

6. The arrangement of claim 5, further comprising a captivated screw as the first fastener mounted to the first fastener opening of each half of each yoke.

7. The arrangement of claim 5, wherein the first fastener opening and the second fastener opening of each yoke each define a longitudinal axis which intersects one another, wherein each yoke half includes two first fastener openings and two second fastener openings.

* * * * *